Sept. 12, 1933.     D. B. CLARK     1,926,084
APPARATUS FOR TESTING DIELECTRIC STRENGTH OF FLUID
Filed Dec. 20, 1926
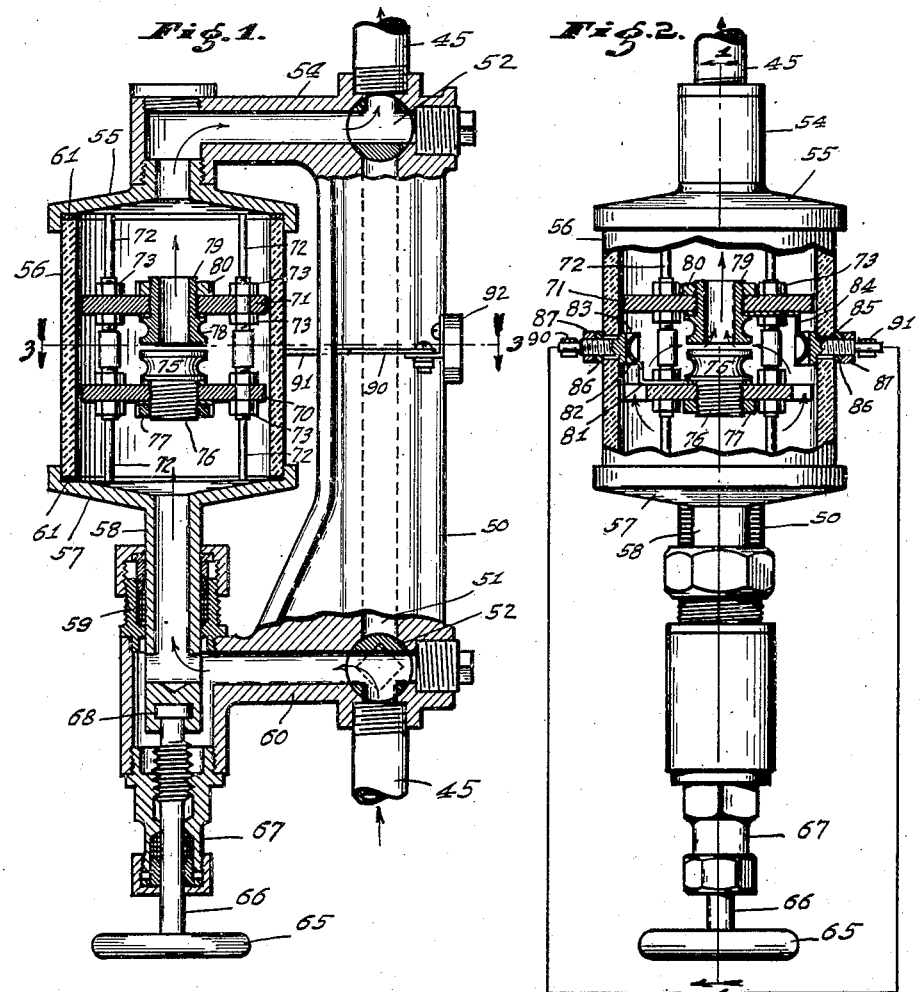
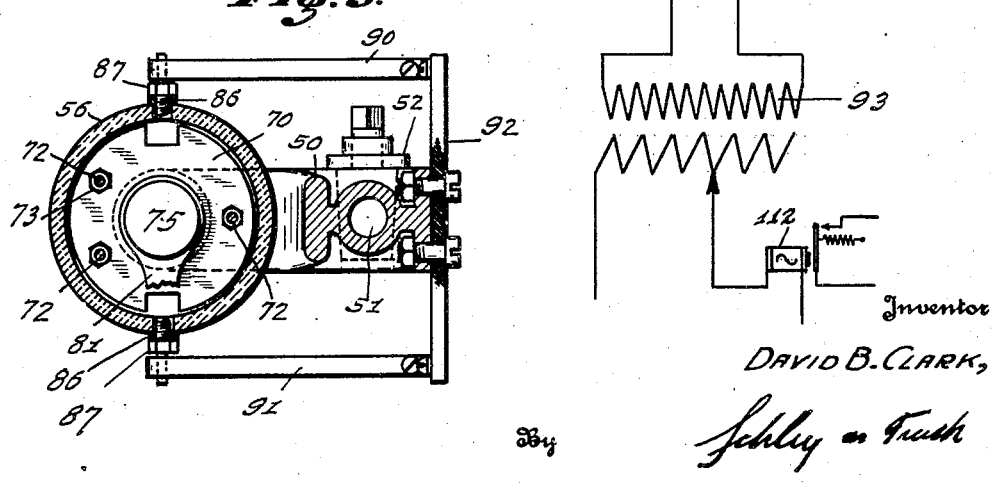
Inventor
DAVID B. CLARK,
By
Schley & Truth
Attorneys Patented Sept. 12, 1933

1,926,084

UNITED STATES PATENT OFFICE 1,926,084

APPARATUS FOR TESTING DIELECTRIC STRENGTH OF FLUID

David B. Clark, Oxford, Mass., assignor to Goulds Pumps, Inc., Seneca Falls, N. Y., a corporation of New York Application December 20, 1926
Serial No. 155,969

1 Claim. (Cl. 175—183)

My invention is concerned with a device for testing the dielectric properties of oil such as is used in electrical apparatus for the purpose of providing insulation.

The customary method of testing the dielectric properties of an insulating oil is to segregate a sample thereof in an open vessel and to note whether or not a spark passes between two electrodes which extend into the oil sample and which are spaced a predetermined distance apart and subjected to a predetermined potential difference.

This method of testing the insulating qualities of the oil has several disadvantages, among which are the fact that only a sample of the oil is tested and the fact that the oil, in the testing vessel, is subjected to exposure to air and may as a result absorb moisture and air which modify its dielectric properties.

It is the object of my invention to produce a testing device by which an operator can determine the dielectric strength of an entire quantity of oil as distinguished from that of a mere sample thereof. A further object of my invention is to produce an oil testing device in which the oil being tested will not be subjected to exposure to air, moisture, or other substances which would affect its dielectric strength.

I accomplish the above objects by providing a closed vessel having inlet and outlet openings and adapted to have a quantity of oil flow through it. In this vessel are located a pair of electrodes which are spaced a predetermined distance apart and which are subjected to a predetermined potential difference. The vessel has a transparent wall or other provisions whereby the passage of a spark between the electrodes may be observed. Desirably, the vessel in which the oil is tested is arranged to be connected in a pipe system through which the insulating oil passes, and means are provided whereby all the oil or only a part of the oil passing through the pipe system may also pass through the testing apparatus.

The accompanying drawing illustrates my invention: Fig. 1 is a fragmental vertical section on the line 1—1 of Fig. 2 illustrating the construction of the testing device; Fig. 2 is a side elevation of the testing device in partial section; and Fig. 3 is a horizontal section through the testing device on the line 3—3 of Fig. 1.

In the drawing, I have illustrated my testing device as connected in a pipe 45, the testing device being adapted to test the dielectric strength of oil passing through such pipe.

My testing device embodies a frame 50 adapted to be inserted in the pipe 45 and provided with an oil passage 51 in line with such pipe. In the frame 50, near each end of the oil passage 51, I mount three-way valves 52 by means of which some or all of the oil flowing through the pipe 45 may be diverted through the testing means.

Projecting laterally near the top of the frame 50 is a hollow arm 54 to the underside of which is affixed a flanged cap 55 adapted to receive the upper end of a hollow cylinder 56 formed of glass or some other transparent material. A second cap 57, similar to the cap 55, receives the lower end of the cylinder 56 and is provided centrally with a downwardly extending hollow shank 58 slidable within a packing flange 59 in a second hollow arm 60 which projects laterally near the bottom of the frame 50. Preferably, gaskets 61 are provided between the ends of the cylinder 56 and the caps 55 and 57.

Suitable means is provided for clamping the hollow cylinder 56 between the caps 55 and 57. Such means may conveniently take the form of a hand wheel 65, the stem 66 of which projects through a gland 67 and is screw-threadedly supported from the arm 60. At its inner end, the stem 66 is provided with a head 68 adapted to be received in a T-slot in the lower end of the shank 58. By rotating the hand wheel 65, the glass 56 may be securely clamped between the caps 55 and 57.

The hollow shank 58 of the cap 57 communicates with the hollow arm 60 and a passage is provided through the cap 55 to the interior of the hollow arm 54. Thus when the valves 52 are properly adjusted, oil may flow through the arm 60 and the shank 58 into the cylinder and thence back to the pipe through the hollow arm 54.

The oil-testing means is located within the hollow cylinder 56 and comprises two plates 70 and 71 of insulating material which are supported in vertically spaced relation on three legs 72 by means of nuts 73. Near the center of the lower plate of insulating material 70 is mounted an electrode in the form of a plug 75 provided with a screw-threaded stem 76 which extends through the plate 70 and on the underside thereof is provided with a nut 77 by means of which the plug 75 may be secured to the plate. A similar plug 78 having a threaded stem 79 and nut 80 is mounted in the plate 71 above the plug 75. The adjacent faces of the plugs 75 and 78 are preferably plane and parallel. One of the plugs, here shown as the plug 78, is provided with an axial hole so that oil in passing through the cylinder 56 may pass between the two plugs 75 and 78 and upward through such axial hole.

In electrical contact with the head of the plug 75 and conveniently located between the head of such plug and the plate 70 is a strip of metal 81 which extends outward and at its end is bent upward to form a contact finger 82 adapted to engage a contact 83 mounted in the wall of the cylinder 56. A similar contact finger 84 serves to connect the plug 78 with a second contact 85 also mounted in the wall of the cylinder 56 and conveniently located diametrically opposite to the contact 83. The contacts 83 and 84 are conveniently provided with screw-threaded shanks which extend through the wall of the cylinder 56 and on the outside thereof are provided with washers 86 and nuts 87 for the purpose of holding the contacts in place.

In electrical contact with the shanks of the contacts 83 and 84 are two contact fingers 90 and 91 respectively which are conveniently supported from a strip 92 of insulating material mounted on the frame 50. The fingers 90 and 91 are connected to the secondary of a transformer 93 in order that a potential difference may be created between the electrodes 75 and 78. Preferably, the fingers 90 and 91 are held in contact with the shanks of the contacts 83 and 84 by their own elasticity in order that they may not interfere with the ready removal of the cylinder 56.

In the operation of my device, the plates 70 and 71 are adjusted so that the electrodes 75 and 78 are a predetermined distance apart, such distance being great enough so that the oil between the electrodes 75 and 78 will not break down under the potential difference existing between the electrodes when the oil is of the desired purity. The three-way valves 52 are arranged to pass through the tester either all or a part of the oil flowing through the pipe 45.

The operation of the device will be evident. With oil passing through the testing device, and with a predetermined potential difference imposed on the electrodes 75 and 78 by the transformer 93, the operator observes the electrodes through the transparent side wall 56 of the testing vessel. So long as no spark passes between the electrodes, the operator knows that the oil flowing through the testing apparatus is of satisfactory dielectric strength. When a spark passes between the electrodes, however, it is evidence that the oil in the testing device is of insufficient dielectric strength, and the operator may take whatever steps may be desired or necessary.

If desired, I may include in the primary circuit of the transformer 93 an alternating-current relay 112. So long as no spark passes between the electrodes 75 and 78, the secondary circuit of the transformer is open, and no current flows in the primary circuit. The relay 112 is therefore de-energized. When the oil between the electrodes breaks down, however, current flows in both the secondary and primary circuits of the transformer 93, and the relay 112 is energized. The relay 112 may be used for various purposes, some of which are disclosed in my co-pending application Serial No. 379,596 filed July 19, 1929.

I claim as my invention:—

An oil-testing device, comprising a casing, a support therefor, end closures for said casing, one of said end closures being provided with a shank mounted for longitudinal sliding movement in said support, said support having a chamber into which the outer end of said shank extends, said shank being provided with a longitudinal passage communicating at one end with said casing and at the other end with said chamber, means for moving said shank and its associated end closure to open or close said casing, and means located within said casing for testing oil passing therethrough.

DAVID B. CLARK.